April 30, 1935. G. MELLING 1,999,248
HYDRAULIC FEED AND CONTROL MECHANISM
Filed Feb. 6, 1933 7 Sheets-Sheet 1
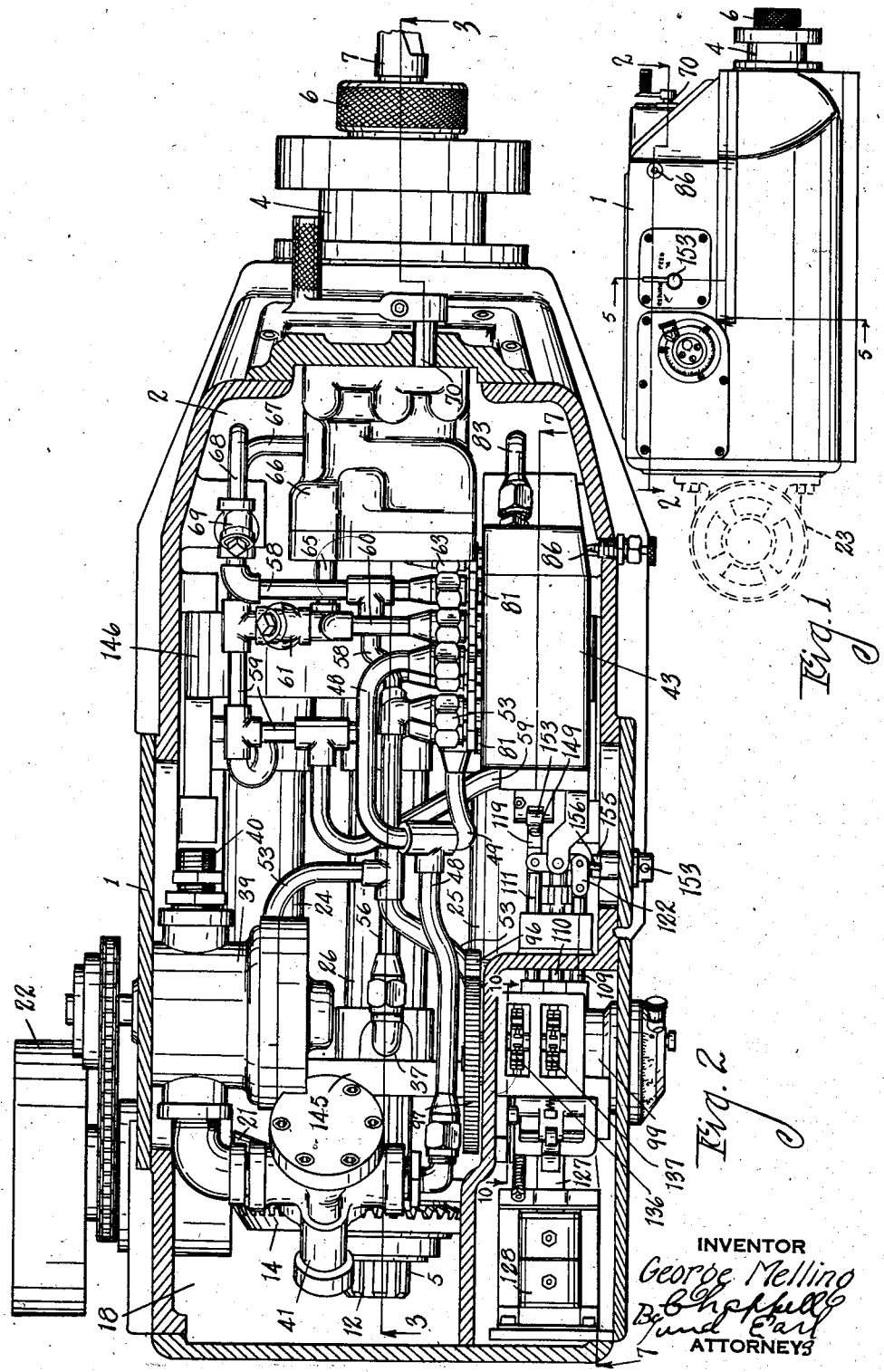
INVENTOR
George Melling
ATTORNEYS

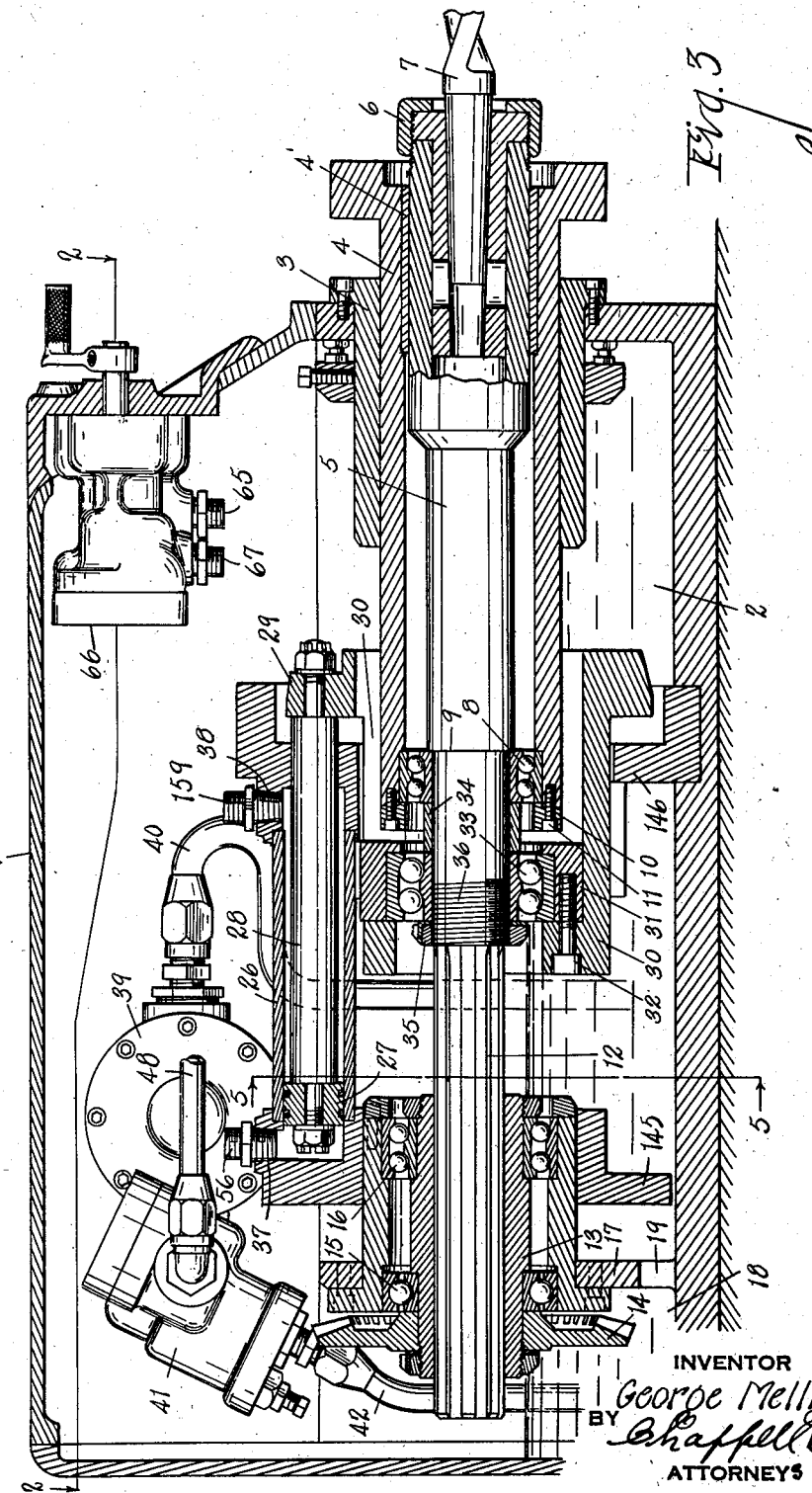

April 30, 1935.  G. MELLING  1,999,248
HYDRAULIC FEED AND CONTROL MECHANISM
Filed Feb. 6, 1933  7 Sheets-Sheet 3

INVENTOR
George Melling
BY Chappell
and Earl
ATTORNEYS

April 30, 1935.  G. MELLING  1,999,248
HYDRAULIC FEED AND CONTROL MECHANISM
Filed Feb. 6, 1933   7 Sheets-Sheet 4
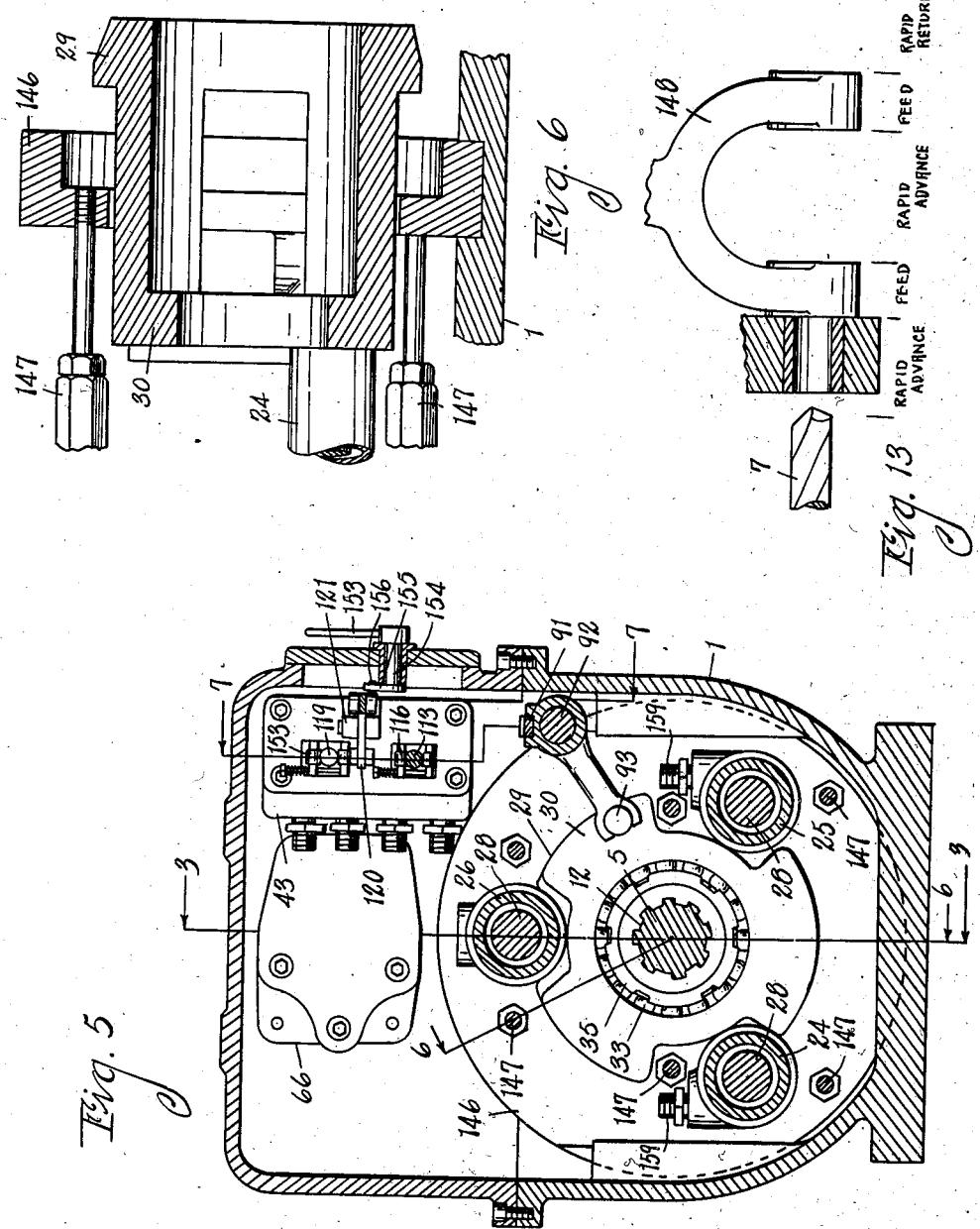
INVENTOR
George Melling
BY
Chappell Earl
ATTORNEYS

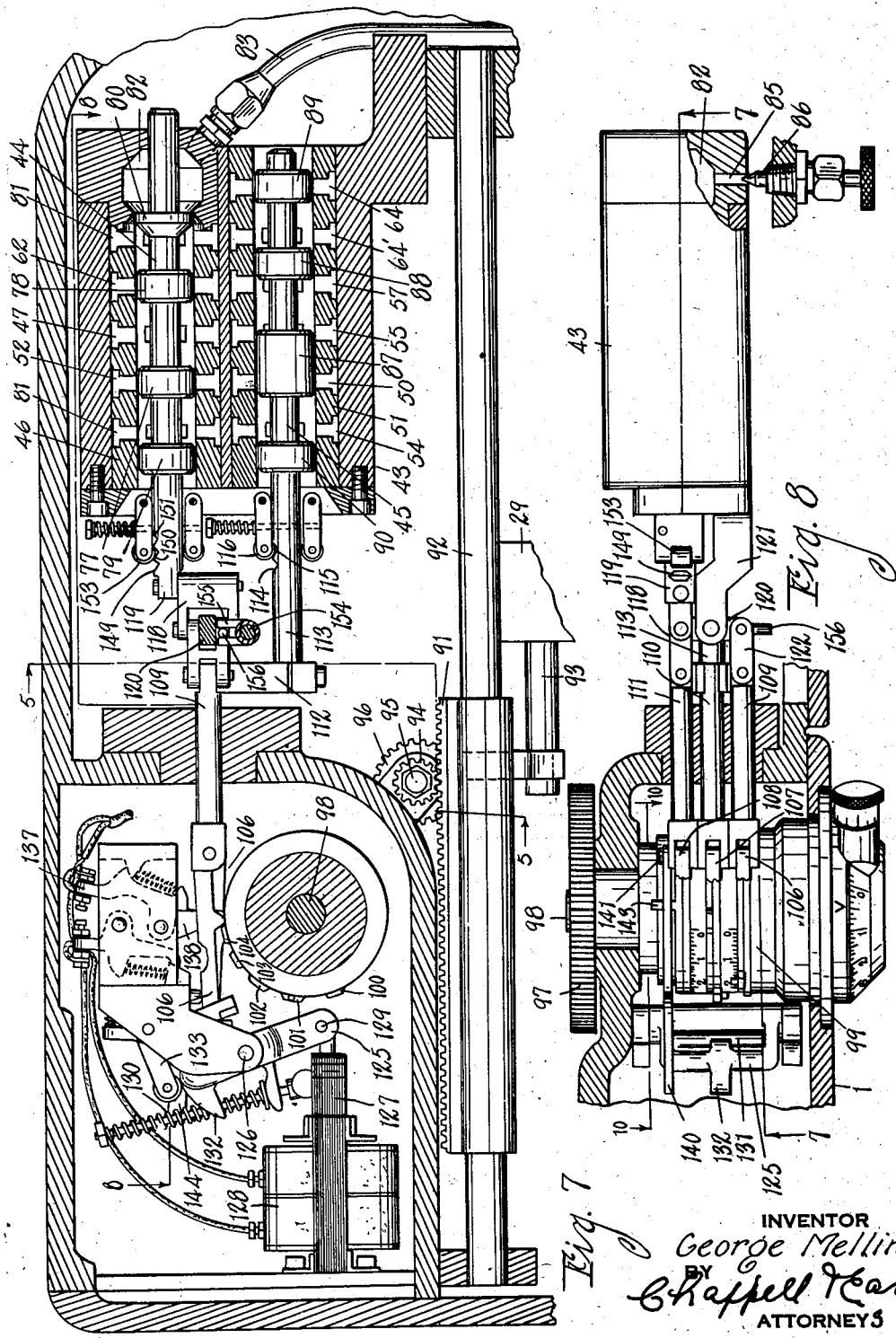

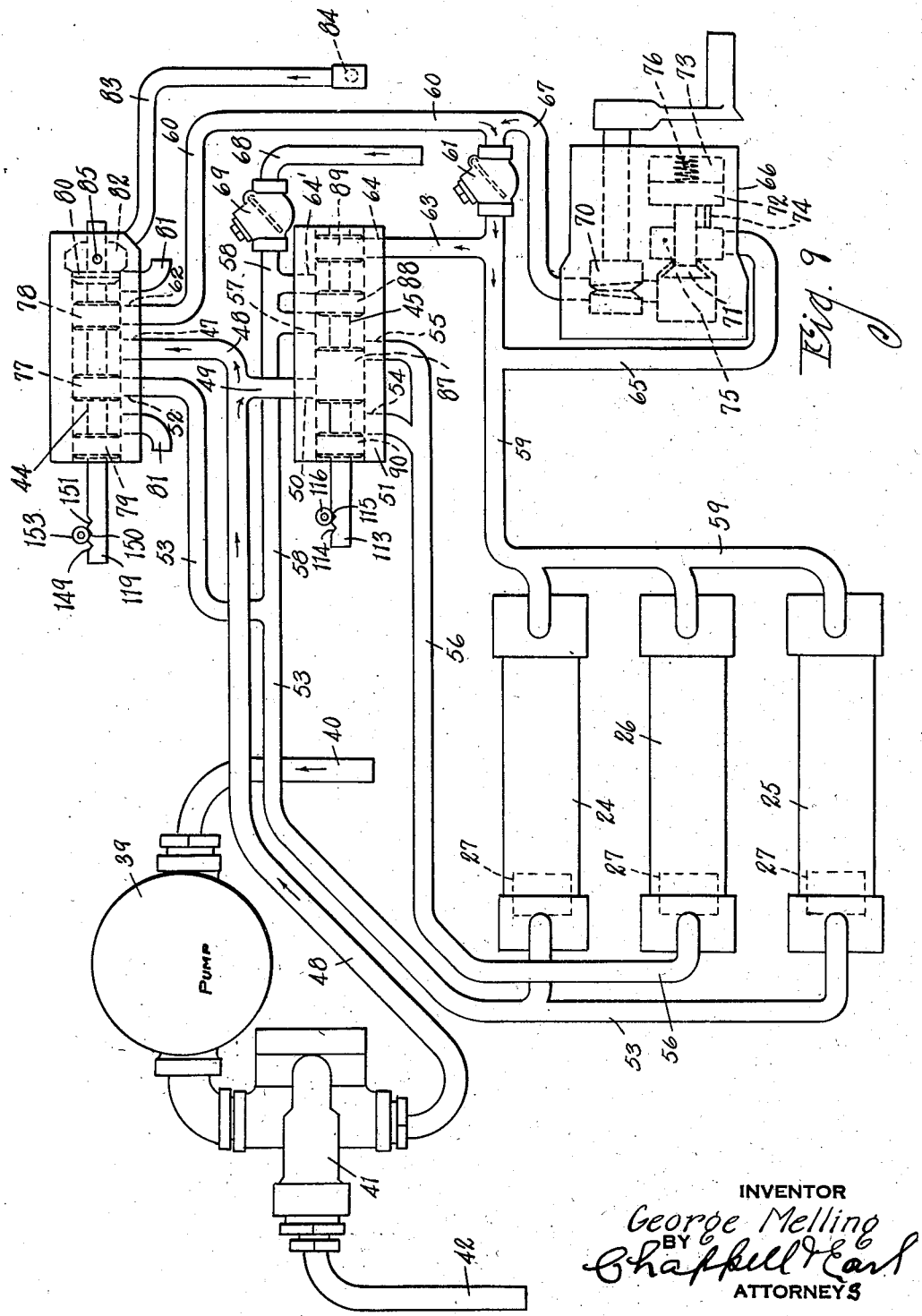

April 30, 1935.    G. MELLING    1,999,248
HYDRAULIC FEED AND CONTROL MECHANISM
Filed Feb. 6, 1933    7 Sheets-Sheet 7
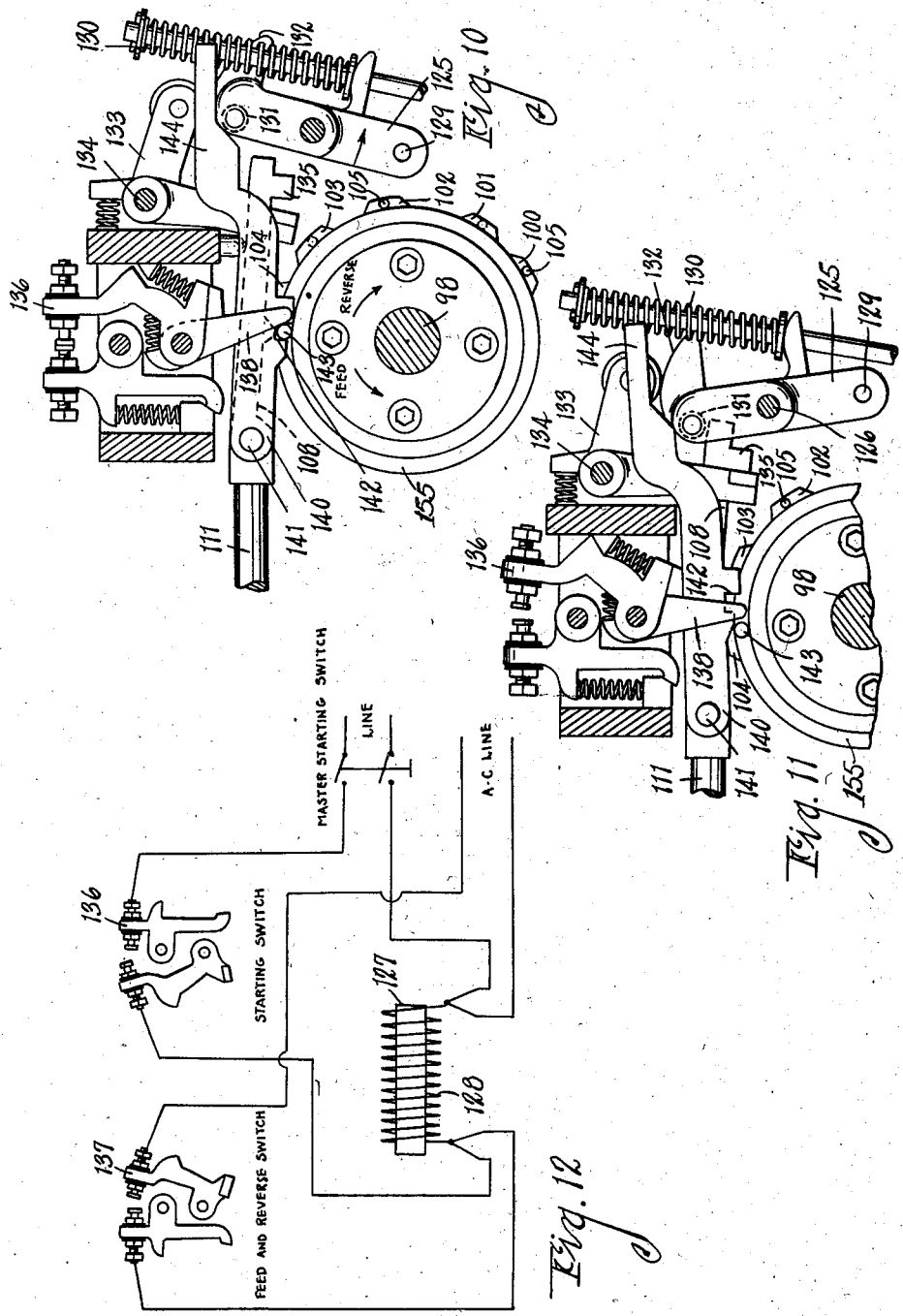
INVENTOR
George Melling
BY
Chappell & Earl
ATTORNEYS Patented Apr. 30, 1935

1,999,248

UNITED STATES PATENT OFFICE 1,999,248

HYDRAULIC FEED AND CONTROL MECHANISM

George Melling, Jackson, Mich.

Application February 6, 1933, Serial No. 655,372

27 Claims. (Cl. 60—52)

The main objects of this invention are:

First, to provide a feed and control mechanism for machine controls which is automatic in operation and adapted for performing successive functions or operations in controlling the feed.

Second, to provide an improved hydraulic feed for machine tools and the like.

Third, to provide a hydraulic feed and control mechanism adapted to rapidly advance a tool at proper speed while working, and providing a quick return therefor.

Fourth, to provide a feed and control mechanism of the hydraulic type which is very compact and may be embodied in a single compact unit.

Fifth, to provide a hydraulic feed and control mechanism which may be successively operated with a relatively small amount of liquid and at relatively low pressures without danger of overheating.

Sixth, to provide a hydraulic feed and control mechanism in which the parts are arranged in a manner to minimize distortion stresses.

Seventh, to provide a feed and control mechanism having a wide range of adaptability and adjustability to accommodate it to various kinds of work.

Objects relating to details and economies of construction and operation of my invention will definitely appear from the description to follow. The invention is defined in the claims.

A structure which embodies the features of my invention is clearly illustrated in the accompanying drawings, in which:

Fig. 1 is a side elevation of a structure or unit embodying my invention, a motor being shown conventionally by dotted lines.

Fig. 2 is a plan view with the housing sectioned on line 2—2 of Figs. 1 and 3.

Fig. 3 is a detail view mainly in vertical longitudinal section on a line corresponding to line 3—3 of Figs. 2, 4 and 5.

Fig. 5 is a transverse section on line 5—5 of Figs. 1, 3, 4 and 7.

Fig. 6 is an enlarged detail section on a line corresponding to line 6—6 of Fig. 5 of the annular crosshead for the feed plunger.

Fig. 7 is an enlarged fragmentary section on a line corresponding to line 7—7 of Figs. 2, 5 and 8 showing details of the control mechanism and the relation thereof to the valves controlled thereby.

Fig. 8 is an enlarged fragmentary view partially in section on line 8—8 of Fig. 7 showing further details of the control mechanism.

Fig. 9 is a diagrammatic view showing the relation of the feed cylinders, control valves, and the pump.

Fig. 10 is an enlarged fragmentary section on a line corresponding to line 10—10 of Figs. 2 and 8, this being a rear view of the control proper.

Fig. 11 is a fragmentary section corresponding to that of Fig. 10 with the parts in another position.

Fig. 12 is a diagrammatic view illustrating the electrical connections for the control.

Fig. 13 is a fragmentary section illustrating a piece of work and showing the advantages incident to my improved feed and control mechanism in relation thereto.

Figure 4:
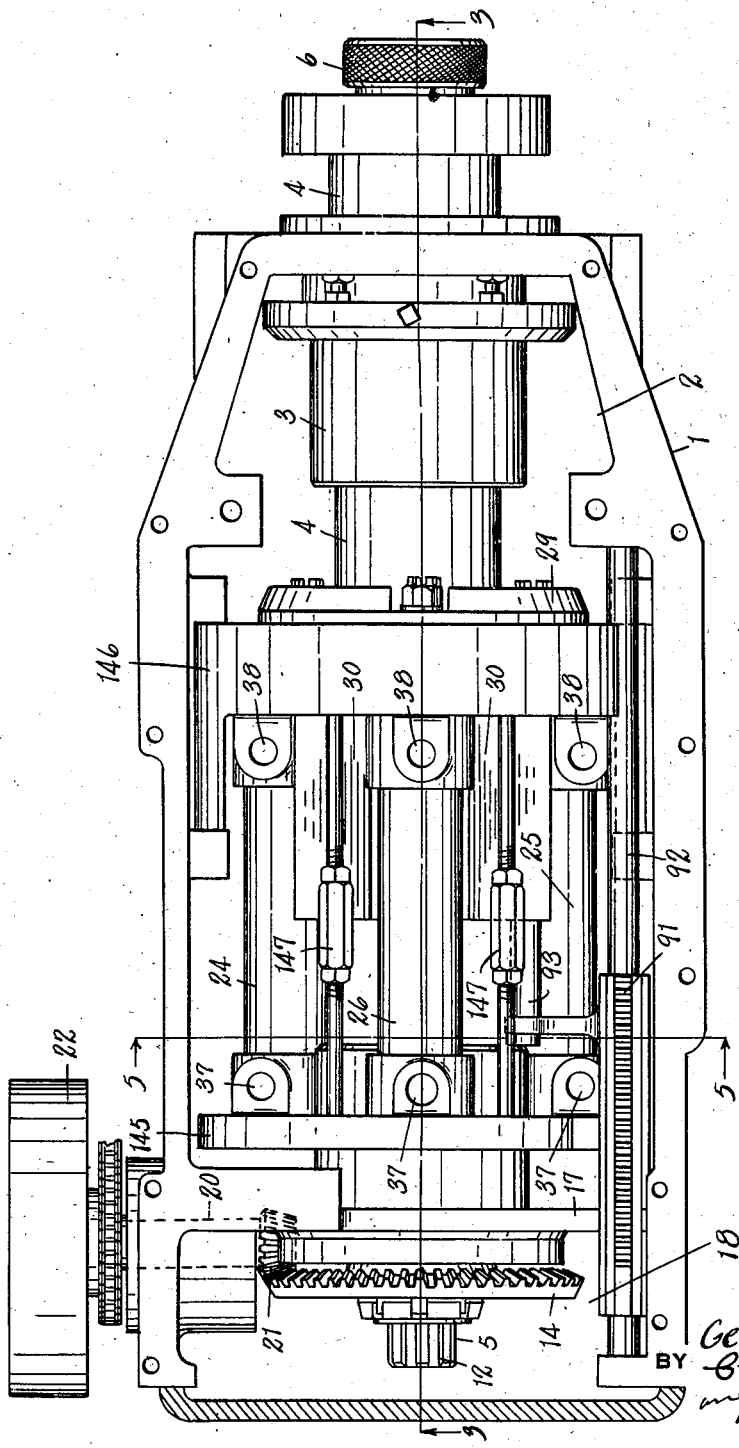
Fig. 4 is a plan view with parts removed showing primarily the feed portion, the upper portion of the housing being removed.

My present improvements are an embodiment and adaptation of the control mechanism of my application for Letters Patent filed August 20, 1932, Serial No. 629,682, now Patent No. 1,950,509, including certain modifications, however, which will be specifically pointed out. In that application I illustrate my invention as adapted in a clutch type or mechanical feed control, whereas, my present application relates to a hydraulic feed and control. The control unit as such is illustrated and described in detail in the aforesaid application and, therefore, I have illustrated and described in this application only such parts thereof as are deemed necessary to the proper understanding of this mechanism and to illustrate such modifications or changes as have been made therein.

The embodiment of my invention here illustrated is an adaptation to a drilling machine, but it should be understood that my improvements are capable of very wide application in machine tools, both as to feeds and work feeds, and in other relations.

In the embodiment illustrated the mechanism is all embodied as a single unit within a housing designated generally by the numeral 1. It will be understood that this is of proper proportions to house the parts and is properly designed to facilitate the assembly thereof. The housing, however, is particularly designed to provide a reservoir 2 for the oil or other suitable fluid.

The front wall of the housing is provided with a bearing 3 for the spindle bearing sleeve or quill 4 surrounding the feed end of the spindle 5, this spindle being provided with a chuck designated generally by the numeral 6 for the tool 7, a drill being illustrated. The spindle bearing sleeve 4 is provided with a radial and thrust bearing 8, the inner member of this bearing engaging shoulder 9 on the spindle. A retaining ring 10 secured to the rear end of the sleeve by the screws 11 secures the outer member of this combined radial and thrust bearing, which is of the ball type, to the sleeve.

The spindle has a splined portion 12 at its rear end slidable in the driving sleeve 13 having a gear 14 secured to its rear end. This tubular driving shaft or sleeve 13 is supported in bearings 15 and 16 carried by the wall or web 17 extending across the housing and constituting a pedestal for the bearing. This bearing member is fixedly secured to the wall by screws as indicated by dotted lines in Fig. 3. The wall 17 extending across the housing serves as a partition for the lubricant chamber or reservoir 2 providing a separate chamber 18 in which the gear 14 revolves. A relatively small connecting passage 19 is provided for the two reservoirs so that while the level is maintained in the chamber 18 the agitation which results from the rotation of the gear in the lubricant does not impart itself to the lubricant in the reservoir 2, and bubbles which might be occasioned by the agitation through the gear do not pass into the chamber 2.

The gear 14 is driven from the shaft 20 shown by dotted lines in Fig. 4, this shaft having a beveled gear 21 on its inner end meshing with the gear 14 and having a driving pulley 22 on its outer end. The details of this drive, however, may be varied to meet conditions although one of the main advantages of the mechanism is its adaptability to the so-called unit drives, that is, drives having individual motors as distinguished from line shaft drives. The motor is indicated at 23, Fig. 1.

My improved feed mechanism comprises a plurality of cylinders, three in the embodiment illustrated, designated by the numerals 24, 25 and 26. These cylinders are each provided with a plunger 27 having plunger rods 28 of relatively large diameter, the purpose of which will appear as the description proceeds. These plunger rods are all of the same length and connected to an annular cross head 29 which surrounds the feed chamber. This annular crosshead has a rearwardly extending sleeve portion 30 in which the bearing supporting ring 31 is secured by means of the screws 32, the outer member of the combined thrust and radial bearing 33 being supported by the bearing ring 31 and the inner member thereof being arranged on the spindle.

This inner bearing member is clamped against the spacing collar 34 by means of the nut 35 on the spindle, the spindle having a threaded portion 36 to receive the nut. The spacing collar engages the combined radial and thrust bearing 8 described for the spindle so that the crosshead is directly connected to the spindle 5. The spindle bearing sleeve 4 is thus, in effect, connected to the crosshead to move with the spindle and provides a long support for the spindle. The bearing 4' at the front end of the spindle sleeve is in the embodiment illustrated a plain bearing.

The cylinders are uniformly spaced about the spindle so that the thrusts of the plungers and the rods on the spindle are all uniformly distributed and centralized, there being no distorting or side stresses resulting from the feed pressure or the reaction through the spindle. Each cylinder is provided with a port 37 and 38, these ports being beyond or outside of the stroke of the plunger. The ports 37 are the feed ports and the ports 38 are the return ports. The connections for these cylinders are diagrammatically illustrated in Fig. 9, the pump 39 being shown in operative relation to the control valves and the cylinders. The pump is provided with a supply pipe 40 which draws from the reservoir 2 and a relief valve 41 discharging through the pipe 42 to the chamber 18, and through the passage or opening 19 to the supply reservoir.

The cylinders are controlled through a valve mechanism designated generally by the numeral 43, see Fig. 2, including a main valve control 44 and an auxiliary control valve 45. The terms "main" and "auxiliary" are used mainly for convenience in description as both are necessary for the full functioning of the mechanism. The main valve cylinder 46 has a central inlet port 47 connected by the conduit 48 to the discharge of the pump. The conduit 48 has a branch 49 connecting to the inlet port 50 of the cylinder 51 of the auxiliary valve 45. The cylinder 46 has a discharge port 52 connected by the conduit 53 which is suitably branched to the inlet ports of the cylinders 24 and 25.

The auxiliary valve cylinder 51 has discharge ports 54 and 55 connected by the conduit 56 to the inlet port of the cylinder 26. The port 55, however, is not directly connected with the inlet port 50 in any position of the valve 45 but when the valve 45 is in one position the port 55 is connected to the inlet port 57 which is in turn connected to the conduit 53 by the conduit 58, or, in effect, to the source of supply through the main valve.

The connections described are those that provide the fluid for the feed stroke. I will now describe the connections for supplying the fluid to the cylinders for the return stroke or the connections to the return ports of the cylinders.

It will be noted by reference to Fig. 9 that the return ports of the cylinder are all provided with a common return fluid connection comprising conduits 59 and 60 connected through a check valve 61, the conduit 60 being connected to the discharge port 62 of the main valve cylinder or casing. It will also be noted that the check valve 61 permits fluid to flow through the plunger return conduit from the main valve only in one direction. However, the section 59 of this connection is provided with a branch 63 leading to the port 64 of the auxiliary valve cylinder or casing and a second branch 65 leading to a feed control and compensating unit designated generally in Fig. 9 by the numeral 66.

This unit 66 has a return conduit 67 opening to the conduit 60 in advance of the check valve 61. The conduit 63 is in effect an exhaust or return conduit which is brought into operation only during the rapid advance stroke of the spindle to the work during which rapid advance power is delivered only through the unit comprising the cylinder 26.

To compensate for the rapid movement of the plunger a supplemental or auxiliary supply of fluid to the head-ends of the cylinders 24 and 25 is desired. This is provided through the conduit 59 and through the conduit 63, at which time the valve 45 is in position to permit the passage through the port 64 and the port 64' into the conduits 58, which is, as described, connected to the feed conduit 53 and thereby to the heads of the cylinders 24 and 25.

As there is not sufficient exhaust or fluid discharge through the conduit 59 to make up for the displacement in the cylinders, a supply conduit 68 is provided depending into the supply reservoir and having a check valve 69 so that the plungers, acting in effect as suction pumps, will draw any additional supply required direct from the fluid supply.

The compensating and regulating valve unit 66 includes the regulating valve 70 and the compensating valve 71, this compensating valve being provided with a plunger 72 arranged in a suitable plunger chamber 73 connected by the passage 74 to the inlet chamber 75 to which the conduit 65 delivers. The valve 71 controls the discharge from this chamber 75 and is held yieldingly from its seat by means of the spring 76. However, in the event of a sudden increase in pressure or flow of fluid, such as must result when the tool strikes a soft spot in the work or breaks through, the increase of pressure will actuate the valve 71 toward its seat, thereby cutting down the flow of fluid to the control valve 70 which is adjusted to regulate the flow of fluid through the passage 67.

The valves 44 and 45 are of the plunger type. The valve 44 has heads 77 and 78 adapted to connect the supply passage 48 with either the cylinder passages or conduits 53 or 60, or to close them both when the valve is in neutral position as shown in Fig. 8. The valve has packing heads 79 and 80 while the casing has exhaust connections 81 disposed at the outside of the outlet connections and at the inside of the inner stroke limits of the packing heads 79 and 80. The packing head 80, however, performs an additional function of serving as a dashpot plunger, a dashpot or cushioning chamber 82 being provided in the valve casing at the outside of this head 80.

The chamber 82 is connected by the conduit 83 to the source of fluid supply and has a ball check 84 at its lower end or at the foot of the conduit. This dashpot chamber 82 is provided with a relief or discharge port 85 controlled by the needle valve 86. By the adjustment of this valve 86 the final movement of the valve 44 may be delayed which, in effect, delays the reversing movement or return movement, allowing an interval for the tool to "clean up" or smooth the work at the end of the cut.

The auxiliary valve 45 is provided with heads 87, 88, 89 and 90, the head 90 being in effect a packing head. The head 87 controls the inlet port 50 and the discharge ports 54 and 55. The head 88 is in effect a packing head, and the head 89 controls the port 64. The head 90 is purely a packing head. The head 89 serves the double purpose of packing head and valve.

In the embodiment illustrated the valve cylinders are provided with annular port passages in order to increase the capacity and also to equalize the pressure on the valve or provide a hydraulic balance on the valve. These valves are controlled through my improved control mechanism so as to provide a rapid advance to the work, proper slow feed while the tool is in operation, a second rapid advance in the event such is required by the work, a second slow feed, the cleaning up dwell, as described, for both feed strokes, and rapid return.

During the cutting portions of the strokes the feed is through all of the cylinders which, as stated, are grouped in an annular series so that the thrust is uniform on the annular crosshead and through the crosshead is delivered to the spindle without side or distortion stresses. The rapid work feed, however, is through a single cylinder, substantially the entire volume of the impelling fluid being delivered to one cylinder resulting in a very rapid movement with a relatively small pump supply. The same result is accomplished on the return stroke by reducing the displacement on the plunger rod side of the pistons through employing relatively large plunger rods as shown in Fig. 3. This in the embodiment illustrated reduces the displacement on the plunger rod side of the pistons substantially two-thirds, or, where the capacity of all three cylinders on the return stroke substantially equals the capacity of one cylinder on the forward stroke. This permits the use of all three cylinders on the return stroke with the same result in speed as the use of a single cylinder on the forward stroke.

In the embodiment illustrated the mechanism is shown with the spindle in horizontal position. When it is disposed with the spindle in vertical position this feature of having the return power on all three of the cylinders becomes of considerable importance as the load then is considerably increased. However, the arrangement is highly desirable merely from the standpoint of securing a rapid return.

These valves are automatically controlled by my improved control mechanism which is, as stated, with slight modifications or additions that of my Patent No. 1,950,509. This control mechanism is operatively connected to and driven from the feed through the rack 91 slidable on the rod-like way 92 and connected by the stud 93 to the crosshead 29. This rack coacts with a pinion 94 on the shaft 95 having a gear 96 meshing with a gear 97 on the drum shaft 98. This drum shaft carries a cam drum 99 made up of a plurality of adjustably associated cam elements or members substantially as described in my said patent.

This cam drum in the assembly illustrated in this application has five timing cams 100, 101, 102, 103 and 104. These timing cams, with the exception of cam 104, have tappets 105 for closing the actuating solenoid circuit. The cams are arranged in coacting pairs, and each pair of cams cooperates with one of the selectors 106, 107 and 108, the selectors being connected to the control rods 109, 110 and 111, respectively. The push or control rod 110 may be designated as the rapid advance control rod and is connected through the arm 112 to the stem 113 of the valve 45. This stem 113 has spaced notches 114 and 115 with which the roller spring pressed detent 116 coacts. When the detent is engaged with the notch 115 as shown in Fig. 7 the valve is in neutral position. When the detent is engaged with the notch 114 the valve is in its rapid advance position.

The control rod 111 is connected by the link 118 to the valve stem 119 of the valve 44, this being the reverse control rod. The feed control rod 109 is connected to this same valve stem through the lever 120 pivoted on the bracket 121 and connected to the rod 109 by the link 122. The valve 44 may be manually controlled through the lever 153 having a rockshaft 154 provided with a fork 155 engaging the pin 156 secured to the end of the lever 120.

The selectors are lifted by their actuating cams into position to be engaged by the solenoid operated actuator 125. This actuator is pivoted at 126 and the armature 127 of the solenoid 128 is pivoted thereto at 129. A spring 130 acts to return the actuator 125 to its retracted or initial position and also the armature of the solenoid. When the solenoid is actuated this actuator 125 is actuated so that its tappet portion 131 strikes the end of the selector that may be in elevated or actuated position, and through it its connected control rod. The actuator also serves to return the other control rods to initial or neutral position, it being provided with a cam 132 coacting with a bell crank return lever 133 pivoted at 134 and having a portion disposed below the outer ends of the several selectors and coacting with the depending lugs 135 thereof as shown in Figs. 10 and 11 so that a single actuation of the solenoid actuates the proper control rod and insures the proper positioning of the other control rods.

The switches designated generally by the numerals 136 and 137 control the solenoid, the switch 136 being the starting switch and the switch 137 being the feed and reverse switch. These switches are provided with actuating fingers or triggers 138 which cooperate with tappets 105, Fig. 12 being a wiring diagram of these switches. These control parts are the same as in my said copending application with the addition of a pivoted latch or dog 140 pivotally connected at 141 to the reverse control rod 111. This dog 140 has a notch-like keeper 142 coacting with a pin 143 which also serves as a tappet for the starting switch. The pin 143 is on the end disk 155 which is mounted on the shaft 98.

Fig. 10 shows the switch 136 closed by the pin 143. This energizes the solenoid 128 and causes the mechanism to feed at a rapid rate. As the drum assembly turns counter-clockwise, Figs. 10 and 11, the tappets 105 successively close and open the switch 137 to energize the solenoid at properly timed intervals for slow and fast feed and finally to reverse the mechanism. The reverse is at high speed, the drum assembly turning in a clockwise direction, Figs. 10 and 11, until the pin 143 closes the switch 136 and starts the feed again. The line and A. C. line, Fig. 12, are connected to suitable A. C. current and voltage sources, respectively. The dog 140 has a tail 144 positioned to be engaged by the actuator 125 on the work stroke thereof so that the dog is lifted out of engagement with the pin by the actuator just prior to the actuation of a selector thereby, allowing movement of the reverse control rod through the actuator and the reverse control rod selector.

With this arrangement the tendency for the parts to creep when the machine is at rest, owing to leakage resulting from wear or inaccurate fitting, is compensated. The actuated member is connected through the rack and gearing described to the control drum so that movement of the pistons within the cylinders such as might occur from leakage of the valves will move the crosshead, and through this connection the control drum, and through the drum the reverse valve is slightly opened allowing the pressure to equalize and balance the parts. It will be understood that this is effective when the pump is running and pressure is on the valves.

In the embodiment illustrated the several cylinders have integral head members 145 and 146 connected by adjustable tie rods 147, see Fig. 4. The work 148 illustrated in Fig. 13 is a coupling yoke, the drill 7 being shown in its initial position. In this particular set-up the machine is designed for a rapid advance, a slower feed period, a second rapid advance, a slower feed period, and rapid return. These movements are all automatically effected by the mechanism illustrated, the movement of the spindle being, as described, imparted to the control unit which, in turn, controls the valves.

The stem of the valve 44 is provided with keepers 149, 150 and 151, a coacting detent 153 being provided for yieldingly holding the stem in its adjusted position. The position shown in Fig. 7 is the neutral position. The actuation of the control rod 111 through the control mechanism described moves the valve to the right from its neutral position so that the detent engages the keeper 149. This, through the connections described, admits the fluid to the reverse end of the cylinders as it connects the discharge ports 62 with the inlet port 47. The actuation of the feed control rod 109 moves the valve 44 toward the left so that the detent engages with the keeper 151, thereby connecting the supply port 47 to the port 52 and through its connections to the head of the cylinder.

The valve 45 is, as described, controlled by the rapid advance control rod 110 so that when that rod is actuated to move the valve 44 to neutral position the inlet port 50 is connected to the outlet 54 and through the connection 56 to the head of the cylinder 26, thereby connecting the full volume to this cylinder. The movement of the plungers or pistons may, when feeding into work, be accurately timed by means of the valve 78 and undue acceleration, in the event the tool strikes a soft spot or breaks through the work, is prevented by means of the compensating valve 71.

With this arrangement of parts the mechanism is entirely automatic as stated, may be successfully operated with relatively low pressure with a relatively small amount of oil without overheating.

I have illustrated and described my improvements as embodied in a machine having a rotary spindle but my improvements may be readily embodied in various types of machines for feeding work and other machine operations where it is desired to secure varying movements. I have not illustrated various adaptations which I contemplate as it is believed this disclosure will enable those skilled in the art to embody or adapt my improvements as may be desired.

Having thus described my invention what I claim as new and desire to secure by Letters Patent is:

1. In a power mechanism, the combination with means for supplying actuating fluid at a substantially uniform rate, of a plurality of cylinders, plungers coacting with said cylinders and operatively connected to a common actuated element, connections for the actuating fluid to the feed ends of said cylinders, control means for said connections whereby the actuating fluid may be simultaneously delivered to all of said cylinders or the full volume of actuating fluid delivered to one of said cylinders, a connection for said actuating fluid to the return ends of said cylinders common to all of said cylinders and provided with a check valve, a by-pass for such check valve, a discharge regulating valve disposed in said by-pass connection, and a pressure-flow compensating valve disposed in said by-pass connection in advance of said regulating valve and responsive to the pressure of the fluid, whereby an increase in pressure is opposed by a decrease in flow, said control means acting to by-pass said discharge regulating and pressure flow compensating valves when the actuating fluid is delivered to one cylinder only and connects the exhaust from the return ends of all the cylinders to the feed ends of the other cylinders.

2. In a power mechanism, the combination with means for supplying actuating fluid at a substantially uniform rate, of a plurality of cylinders, plungers coacting with said cylinders and operatively connected to a common actuated element, connections for the actuating fluid to the feed ends of said cylinders, control means for said connections whereby the actuating fluid may be simultaneously delivered to all of said cylinders or the full volume of actuating fluid delivered to one of said cylinders, and a connection for said actuating fluid to the return ends of said cylinders common to all of said cylinders, said control means acting when the actuating fluid is delivered to the feed end of one cylinder only to connect the exhaust from the return ends of all the cylinders with the feed ends of the other cylinders.

3. In a power mechanism, the combination with means for supplying actuating fluid at a substantially uniform rate, of a plurality of cylinders, plungers coacting with said cylinders, plunger rods for said plungers operatively associated with a common actuated element, said plunger rods being of such cross section that the combined capacity of the cylinders on the return strokes of the pistons away from the cylinder ends through which the plunger rods project is substantially equal to the capacity of one cylinder on the forward or feed strokes of the pistons in the opposite direction, connections for the actuating fluid to the feed ends of said cylinders, control means for said connections whereby the actuating fluid may be simultaneously delivered to all of said cylinders or the full volume of actuating fluid delivered to one of said cylinders, and means for simultaneously delivering the full volume of said actuating fluid to the return ends of said cylinders.

4. In a power mechanism, the combination with means for supplying actuating fluid at a substantially uniform rate, of a plurality of cylinders, plungers coacting with said cylinders, plunger rods for said plungers operatively associated with a common actuated element, said plunger rods being of such cross section that the combined capacity of the cylinders on the return strokes of the pistons away from the cylinder ends through which the plunger rods project is substantially equal to the capacity of one cylinder on the forward or feed strokes of the pistons in the opposite direction, connections for the actuating fluid to the feed ends of said cylinders, and control means for said connections whereby the actuating fluid may be simultaneously delivered to all of said cylinders or the full volume of actuating fluid delivered to one of said cylinders.

5. In a machine of the class described, the combination of a plurality of cylinders provided with plungers having plunger rods of such cross section as to reduce the capacity of the combined cylinders on the return strokes or strokes of the plungers away from the cylinder ends through which the plunger rods project to substantially less than on the feed strokes or strokes of the plungers in the opposite direction, said plungers being operatively associated with a common actuated element, means for supplying actuating fluid at a substantially constant rate for driving said plungers in both directions, control means whereby the actuating fluid may be delivered to the several cylinders during portions only of the feed strokes and during other portions of the feed strokes the entire volume is delivered to one of said cylinders and delivering the actuating fluid to said several cylinders simultaneously on their return strokes whereby the plungers are actuated at high speed during portions of their feed strokes and at high speed on their return strokes, an adjustable regulating valve controlling the discharge from the cylinders on the feed strokes of the plungers, and a pressure-flow compensating valve disposed in advance of said regulating valve, said control means acting to by-pass said discharge regulating and pressure flow compensating valves when the actuating fluid is delivered to one cylinder only and connect the exhaust from the return ends of the cylinders to the feed ends of the other cylinders.

6. In a machine of the class described, the combination of a plurality of cylinders provided with plungers having plunger rods of such cross section as to reduce the capacity of the combined cylinders on the non-feed strokes of the plungers to substantially less than on the feed strokes of the plungers, said plungers being operatively associated with a common actuated element, means for supplying actuating fluid at a substantially constant rate for driving said plungers in both directions, and control means whereby the actuating fluid may be delivered to the several cylinders during portions only of the feed strokes and during other portions of the feed strokes the entire volume is delivered to one of said cylinders and delivering the actuating fluid to said several cylinders simultaneously on their non-feed strokes whereby the plungers are actuated at high speed during portions of their feed strokes and at high speed on their non-feed strokes.

7. In a machine of the class described, the combination of a plurality of cylinders provided with plungers, the combined capacity of the cylinders on the return strokes of the plungers being substantially that of the capacity of one cylinder on the feed strokes of the plungers, said plungers being operatively associated with a common actuated element, and means for supplying and controlling the delivery of actuating fluid to the feed ends of said cylinders simultaneously or directing the supply of all of the cylinders to a part only thereof for varying the speed of the actuated element during portions of the feed stroke or for directing the supply of actuating fluid to the return ends of all of the cylinders simultaneously, said directing means being operatively associated with the actuated element to be controlled by the travel thereof.

8. In a machine of the class described, the combination of a plurality of cylinders provided with plungers, the combined capacity of the cylinders on the return strokes of the plungers being substantially that of the capacity of one cylinder on the feed strokes of the plungers, said plungers being operatively associated with a common actuated element, and means for supplying actuating fluid to the feed ends of said cylinders simultaneously or directing the supply of all of the cylinders to a part only thereof for varying the speed of the actuated element during portions of the feed stroke or for directing the supply of actuating fluid to the return ends of all of the cylinders simultaneously.

9. In a machine of the class described, the combination of a plurality of cylinders provided with plungers, the capacity of the cylinders on the return strokes of the plungers being substantially less than the capacity on the feed strokes of the plungers, said plungers being operatively associated with a common actuated element, means for supplying actuating fluid to the feed ends of said cylinders simultaneously or directing the supply of all of the cylinders to a part only thereof for varying the speed of the actuated element during portions of the feed stroke, said means being operatively associated with the actuated element to be controlled by the travel thereof, an adjustable regulating valve operatively associated with the return ends of said cylinders for controlling the discharge therefrom on the work stroke, and a pressure actuated pressure-flow compensating valve arranged in said discharge in advance of said regulating valve, said actuating fluid supply means including means for by-passing said regulating and pressure flow compensating valves when the actuating fluid is supplied to the feed ends of a part only of the cylinders.

10. In a machine of the class described, the combination of a plurality of cylinders provided with plungers, the capacity of the cylinders on the return strokes of the plungers being substantially less than the capacity on the feed strokes of the plungers, said plungers being operatively associated with a common actuated element, means for supplying actuating fluid to the feed ends of said cylinders simultaneously or directing the supply of all of the cylinders to a part only thereof for varying the speed of the actuated element during portions of the feed stroke, said means being operatively associated with the actuated element to be controlled by the travel thereof, and an adjustable regulating valve operatively associated with the return ends of said cylinders for controlling the discharge therefrom on the feed stroke, said means acting to by-pass said regulating valve when the actuating fluid is delivered to the feed ends of a part only of the cylinders and to connect the return ends of all the cylinders with the feed ends of the remaining cylinders.

11. In a machine of the class described, the combination of a plurality of cylinders provided with plungers, the capacity of the cylinders on the return strokes of the plungers being substantially less than the capacity on the feed strokes of the plungers, said plungers being operatively associated with a common actuated element, means for supplying actuating fluid to the feed ends of said cylinders simultaneously or directing the supply of all of the cylinders to a part only thereof for varying the speed of the actuated element during portions of the feed stroke, an adjustable regulating valve operatively associated with the return ends of said cylinders for controlling the discharge therefrom on the work stroke, and a pressure actuated pressure-flow compensating valve arranged in said discharge in advance of said regulating valve, said means acting to by-pass said regulating and pressure flow compensating valves when the actuating fluid is delivered to the feed ends of a part only of the cylinders.

12. In a machine of the class described, the combination of a plurality of cylinders provided with plungers operatively associated with a common actuated element, means for supplying actuating fluid to the feed ends of said cylinders simultaneously or directing the supply of all of the cylinders to a part only thereof for varying the speed of the actuated element during portions of the feed stroke, said means being operatively associated with the actuated element to be controlled by the travel thereof, an adjustable regulating valve operatively associated with the return ends of said cylinders for controlling the discharge therefrom on the work stroke, and a pressure actuated pressure-flow compensating valve arranged in said discharge in advance of said regulating valve whereby an increase in pressure is balanced by a decrease in flow, said means acting when the actuating fluid is delivered to the feed ends of a part only of the cylinders to by-pass said regulating and pressure flow compensating valves.

13. In a machine of the class described, the combination of a plurality of cylinders provided with plungers operatively associated with a common actuated element, means for supplying actuating fluid to the feed ends of said cylinders simultaneously or directing the supply of all of the cylinders to a part only thereof for varying the speed of the actuated element during portions of the feed stroke, said means being operatively associated with the actuated element to be controlled by the travel thereof, and an adjustable regulating valve operatively associated with the return ends of said cylinders for controlling the discharge therefrom on the work stroke, said means acting when the actuating fluid is supplied to a part only of the cylinders to by-pass said regulating valve.

14. In a machine of the class described, the combination of a plurality of cylinders provided with plungers operatively associated with a common actuated element, means for supplying actuating fluid to the feed ends of said cylinders simultaneously or directing the supply of all of the cylinders to a part only thereof for varying the speed of the actuated element during portions of the feed stroke, an adjustable regulating valve operatively associated with the return ends of said cylinders for controlling the discharge therefrom on the work stroke, and a pressure actuated compensating valve arranged in said discharge in advance of said regulating valve for decreasing the fluid flow in response to an increase in the fluid pressure, said means acting when the actuating fluid is delivered to the feed ends of a part only of the cylinders to by-pass said regulating and compensating valves.

15. In a machine of the class described, the combination with means for supplying an actuating fluid at a substantially uniform rate, of a plurality of cylinders, plungers coacting with said cylinders, an actuated member common to all of said plungers, control means for the actuating fluid for delivering it simultaneously to all of said cylinders, or delivering the full volume to a part only of the cylinders, thereby varying the speed of the actuated member during its feed stroke, and a plunger return connection for said actuating fluid to said cylinders common to all of the cylinders, said plungers having means associated therewith for substantially reducing the capacity of the cylinders on the return strokes of the plungers.

16. In a machine of the class described, the combination with means for supplying an actuating fluid at a substantially uniform rate, of a plurality of cylinders, plungers coacting with said cylinders, an actuated member common to all of said plungers, fluid connections for delivering the actuating fluid simultaneously to all of said cylinders, or delivering the full volume to a part only of the cylinders, thereby varying the speed of the actuated member during its feed stroke, a plunger return connection for the actuating fluid to said cylinders common to all of the cylinders, said plungers having means associated therewith for substantially reducing the capacity of the cylinders on the return strokes of the plungers, said control means including valves and a valve control unit operatively associated with the actuated element, one of said valves controlling the delivery of the actuating fluid to the return ends of all of the cylinders and to the feed ends of a part of the cylinders, the other valve controlling the delivery to the feed end of the remaining cylinder or cylinders.

17. In a machine of the class described, combination with means for supplying an actuating fluid at a substantially uniform rate, of a plurality of cylinders, plungers coacting with said cylinders, an actuated member common to all of said plungers, fluid connections whereby the actuating fluid may be simultaneously delivered to all of said cylinders, or the full volume delivered to a part only of the cylinders, thereby varying the speed of the actuated member during its feed stroke, a plunger return connection for the actuating fluid to said cylinders common to all of the cylinders, said control means including valves and a valve control unit operatively associated with the actuated element, one of said valves controlling the delivery of the actuating fluid to the return ends of all of the cylinders and to the feed ends of a part of the cylinders, the other valve controlling the delivery to the feed end of the remaining cylinder or cylinders.

18. In a machine of the class described, the combination of a plurality of cylinders, and coacting plungers, an actuated member operatively associated therewith, means for simultaneously delivering actuating fluid to the work ends of all of said cylinders during part of the stroke of the plungers and only to a portion of the cylinders during another part of such stroke of the plungers including a control valve unit having valves and a control unit for said valve unit including a cam drum having a plurality of cams adjustably associated therewith and driving connections from the actuated member to said drum whereby the valves are actuated at predetermined points in the stroke of the actuated member.

19. In a machine of the class described, the combination with an actuated element, of a plurality of cylinders operatively associated therewith and provided with plungers, the combined capacity of the cylinders on the return strokes of the plungers being substantially that of one cylinder on the feed strokes of the plungers, means for supplying fluid in substantially uniform volume and at a substantially uniform rate, a main valve casing having a central inlet port connected to the source of supply, ports disposed at each side of the inlet port and exhaust ports disposed at the outer sides of the outlet ports, said main valve casing having a dashpot chamber provided with a check valved intake to a source of supply and with a valved vent, one of said main valve outlet ports being connected to the feed ends of a part of the cylinders and the other outlet port being connected to the return ends of all the cylinders, the latter connection having a return check valve therein, an auxiliary valve casing having an inlet port connected to the feed end of a source of supply and an outlet port connected to the feed end of another cylinder, said auxiliary valve casing also having relief and make-up ports connected to the return connections, the connection for said make-up ports to the feed ends of the cylinders also having a check valved connection to a source of supply, main and auxiliary valves for controlling said several ports, said main valve having a dashpot head cooperating with said dashpot chamber whereby a dwell is provided in the movement of the valve, the auxiliary valve being adapted to open said make-up port when the auxiliary valve is in neutral position and in position to deliver to the single cylinder, and a by-pass connection for said check valve in said cylinder return connection of said main valve, said by-pass connection having a regulating valve and a pressure compensating valve therein for decreasing the fluid flow in response to an increase in pressure.

20. In a machine of the class described, the combination with an actuated element, of a plurality of cylinders operatively associated therewith and provided with plungers, the combined capacity of the cylinders on the return strokes of the plungers being substantially that of one cylinder on the feed strokes of the plungers, means for supplying fluid in substantially uniform volume and at a substantially uniform rate, a main valve casing having a central inlet port connected to the source of supply, ports disposed at each side of the inlet port and exhaust ports disposed at the outer sides of the outlet ports, said main valve casing having a dashpot chamber provided with a check valved intake to a source of supply and with a valved vent, one of said main valve outlet ports being connected to the feed ends of a part of the cylinders and the other outlet port being connected to the return ends of all the cylinders, the latter connection having a return check valve therein, an auxiliary valve casing having an inlet port connected to the feed end of a source of supply and an outlet port connected to the feed end of another cylinder, said auxiliary valve casing also having relief and make-up ports connected to the return connections, the connection for said make-up ports to the feed ends of the cylinders also having a check valved connection to a source of supply, and main and auxiliary valves for controlling said several ports, said main valve having a dashpot head cooperating with said dashpot chamber whereby a dwell is provided in the movement of the valve, the auxiliary valve being adapted to open said make-up port when in position to deliver to the single cylinder.

21. In a machine of the class described, the combination with an actuated element, of a plurality of cylinders operatively associated therewith and provided with plungers, the combined capacity of the cylinders on the return strokes of the plungers being substantially that of one cylinder on the feed strokes of the plungers, means for supplying fluid in substantially uniform volume and at a substantially uniform rate, a main valve casing having a central inlet port connected to the source of supply, ports disposed at each side of the inlet port and exhaust ports disposed at the outer sides of the outlet ports, one of said main valve outlet ports being connected to the feed ends of a part of the cylinders and the other outlet port being connected to the return ends of all the cylinders, the latter connection having a return check valve therein, an auxiliary valve casing having an inlet port connected to the feed end of a source of supply and an outlet port connected to the feed end of another cylinder, said auxiliary valve casing also having relief and make-up ports connected to the return connections, the connection for said make-up ports to the feed ends of the cylinders also having a check valved connection to a source of supply, main and auxiliary valves for controlling said several ports, the auxiliary valve being adapted to open said make-up port when in position to deliver to the single cylinder, and a by-pass connection for said check valve in said cylinder return connection of said main valve, said by-pass connection having a regulating valve and a pressure-flow compensating valve therein.

22. In a machine of the class described, the combination with an actuated element, of a plurality of cylinders operativey associated therewith and provided with plungers, the combined capacity of the cylinders on the return strokes of the plungers being substantially that of one cylinder on the feed strokes of the plungers, means for supplying fluid at a substantially uniform rate, a main valve casing having a central inlet port connected to the source of supply, ports disposed at each side of the inlet port and exhaust ports disposed at the outer sides of the outlet ports, one of said main valve outlet ports being connected to the feed ends of a part of the cylinders and the other outlet port being connected to the return ends of all the cylinders, the latter connection having a return check valve therein, an auxiliary valve casing having an inlet port connected to the feed end of a source of supply and an outlet port connected to the feed end of another cylinder, said auxiliary valve casing also having relief and make-up ports connected to the return connections, the connection for said make-up ports to the feed ends of the cylinders also having a check valved connection to a source of supply, and main and auxiliary valves for controlling said several ports, the auxiliary valve being adapted to open said make-up port when in position to deliver to the single cylinder.

23. In a machine of the class described, the combination with an actuated element, of a plurality of cylinders operatively associated therewith, means for supplying fluid, a main valve casing having a central inlet port connected to the source of supply, ports disposed at each side of the inlet port and exhaust ports disposed at the outer sides of the outlet ports, said main valve casing having a dashpot chamber provided with a vent, one of said main valve outlet ports being connected to the feed ends of a part of the cylinders and the other outlet port being connected to the return ends of all the cylinders, the latter connection having a return check valve therein, an auxiliary valve casing having an inlet port connected to the feed end of a source of supply and an outlet port connected to the feed end of another cylinder, said auxiliary valve casing also having relief and make-up ports connected to the return connections, main and auxiliary valves for controlling said several ports, said main valve having a dashpot head cooperating with said dashpot chamber whereby a dwell is provided in the movement of the valve, the auxiliary valve being adapted to open said make-up port when in position to deliver to the single cylinder, and a by-pass connection for said check valve in said cylinder return connection of said main valve, said by-pass connection having a regulating valve.

24. In a machine of the class described, the combination with an actuated element, of a plurality of cylinders operatively associated therewith, means for supplying fluid, a main valve casing having a central inlet port connected to the source of supply, ports disposed at each side of the inlet port and exhaust ports disposed at the outer sides of the outlet ports, one of said main valve outlet ports being connected to the feed ends of a part of the cylinders and the other outlet port being connected to the return ends of all the cylinders, the latter connection having a return check valve therein, an auxiliary valve casing having an inlet port connected to the feed end of a source of supply and an outlet port connected to the feed end of another cylinder, said auxiliary valve casing also having relief and make-up ports connected to the return connections, and main and auxiliary valves for controlling said several ports, the auxiliary valve being adapted to open said make-up port when in position to deliver to the single cylinder.

25. The combination in a hydraulic mechanism including a power cylinder and actuated member operatively associated therewith, of a plurality of control valves, a plurality of control elements operatively associated with said valves, one being a reverse element, a cam unit provided with a plurality of lifts, selectors operatively associated with said control elements and disposed in coacting relation to said lifts, a solenoid, an actuating member operatively associated with said solenoid and common to all of said selectors, said selectors being actuated into a position to be engaged by said actuating member by the cams and being normally out of the path of said actuating member, a return member common to all of said selectors, said selectors being in inoperative relation to said return member when in operative relation to said actuating member, said actuating member being actuated to return said return member prior to its actuation of a selector, control switches for said solenoid, actuated members for said control switches disposed in the path of said tappets, on said cam unit whereby said switches are closed in timed relation to the actuation of the selectors by said cams, operating connections for said actuated member to said cam unit, and a dog operatively associated with the reverse element selector and normally engaging the cam unit whereby creeping movement of the actuated member will be imparted to the cam.

26. The combination of a plurality of control elements, one being a reverse element, a cam unit provided with a plurality of lifts, selectors operatively associated with said control elements and disposed in coacting relation to said lifts, a solenoid, an actuating member operatively associated with said solenoid and common to all of said selectors, said selectors being actuated into a position to be engaged by said actuating member by the cams and being normally out of the path of said actuating member, a return member common to all of said selectors, said selectors being in inoperative relation to said return member when in operative relation to said actuating member, said actuating member being actuated to return said return member prior to its actuation of a selector, control switches for said solenoid, actuated members for said control switches disposed in the path of said tappets on said cam unit whereby said switches are closed in timed relation to the actuation of the selectors by said cams, operating connections for said cam unit, and a dog operatively associated with the reverse element selector and normally engaging the cam unit.

27. The combination in a hydraulic mechanism including a power cylinder and actuated member operatively associated therewith, of a valve mechanism, a control means therefor including a multiple cam unit having driving connection to said actuated member, control elements for said valve mechanism provided with selectors, operatively associated with said cam unit, one of said elements being a reverse element, an electrically actuated control element actuator common to all of said selectors, said selectors being actuated to position to be engaged by said actuating member by the cam and being normally out of the path of said control element actuator, control switches for said control element actuator controlled by said cam unit, and means normally connecting said cam unit with the reverse control element.

GEORGE MELLING.